United States Patent [19]

Mahlein et al.

[11] 4,139,262
[45] Feb. 13, 1979

[54] FILTER FOR A LIGHT WAVE IN A LIGHT GUIDING FIBER

[75] Inventors: Hans Mahlein; Gerhard Winzer, both of Munich, Fed. Rep. of Germany

[73] Assignee: Siemens Aktiengesellschaft, Berlin, Munich, Fed. Rep. of Germany

[21] Appl. No.: 761,006

[22] Filed: Jan. 12, 1977

Related U.S. Application Data

[63] Continuation-in-part of Ser. No. 601,269, Aug. 4, 1975, abandoned.

[30] Foreign Application Priority Data

Sep. 6, 1974 [DE] Fed. Rep. of Germany ....... 2442859

[51] Int. Cl.² .............................................. G02B 5/14
[52] U.S. Cl. .............................. 350/96.33; 350/96.30; 350/164
[58] Field of Search ............... 350/96 R, 96 WG, 164, 350/96.29, 96.30, 96.33

[56] References Cited

U.S. PATENT DOCUMENTS

| 3,436,141 | 4/1969  | Comte ................................. 350/96 R |
| 3,621,457 | 11/1971 | Cuff .................................... 350/96 WG |
| 3,949,315 | 4/1976  | Zeidler ........................ 350/96 WG X |
| 4,000,416 | 12/1976 | Goell ........................... 350/96 WG X |
| 4,006,964 | 2/1977  | Mahlein et al. ........... 350/96 WG X |

*Primary Examiner*—John K. Corbin
*Assistant Examiner*—John D. Lee
*Attorney, Agent, or Firm*—Hill, Gross, Simpson, Van Santen, Steadman, Chiara & Simpson

[57] ABSTRACT

A filter comprising multiple cylindrical layers of alternately high- and low-refractive materials and surrounded by a light-absorbent material with an outer diffusing surface is deposited by evaporation about a short axial length of a glass fiber to polarize or spectrum-filter light passing through said fiber. The indices of refraction of the filter layers are higher than the effective guide indices of the modes of the fiber core.

4 Claims, 1 Drawing Figure

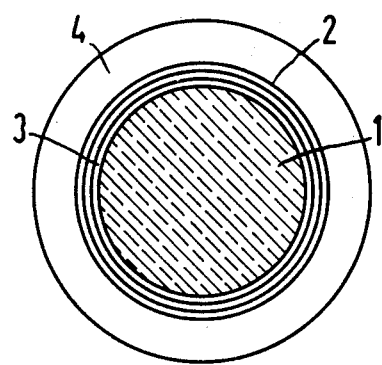

2

FILTER FOR A LIGHT WAVE IN A LIGHT GUIDING FIBER

RELATED APPLICATION

The present application is a continuation-in-part of copending application Ser. No. 601,269 filed Aug. 4, 1975, claiming under 35 USC § 119 the benefit of the filing date of the corresponding German application No. P 24 42 859.9, Sept. 6, 1974. The parent application, Ser. No. 601,269 is now abandoned.

BACKGROUND OF THE INVENTION

1. Field of the Invention

The invention relates to a device for filtering a light wave within a light-guiding fiber.

2. The Prior Art

Light-guiding fibers transmit optical information. In many cases, light waves in such fibers must for various reasons be subjected to polarization filtering or frequency-selective filtering. Such filtering is commonly performed before the light waves are fed into the fiber, or after transmission therethrough and after the light waves have been decoupled from the fiber. Because of space limitations, however, it is often desirable to filter a light wave without decoupling it from the end surface of the light-guiding fiber.

Thin-film filters are well known in the art such as from the German Offenlegungschrift No. 2,252,826. The Comte U.S. Pat. No. 3,436,141 discloses a hollow wave guide having a multiple layer cladding for selectively guiding only monochromatic light having a grazing incidence to the guide walls.

SUMMARY OF THE INVENTION

It is an object of the invention to provide a polarization or frequency-selective filter or a reflector for treating light in a light-guiding fiber without interrupting the fiber.

In accordance with the invention, a multilayer system having alternate high-refractive and low-refractive layers whose indices of refraction are greater than effective guide indices for light wave modes in the fiber which are to be coupled into the multilayer system surround the fiber over a short axial length thereof. An effective guide index is applied to each mode guided in the fiber having a discrete zigzag angle $\theta$ from a line normal to the guide/cladding interface, each angle $\theta$ being such that phase shifts in the light along the fiber are a multiple of $2\pi$. The indices of refraction of the layers are higher than the effective guide indices of the unfiltered, guided modes, which in turn equal the index of refraction of the fiber times the sine of the zigzag angle $\theta$.

The refractive index and effective guide index differences create a leaky structure at the site of the multilayer system around the light-guiding fiber, causing the light in the fiber to be coupled into the multilayer system. Due to the interference therein, and depending on the dimensions of the individual layers, a frequency-selective filtering, reflection, or polarization may be obtained in the multilayers, as described in the German Offenlegungschrift No. 2,252,826. The specific embodiment of the filter, along with the number of high-refractive and low-refractive layers, their indices of refraction and angles of incidence $\theta$ of the light waves onto the first layer of the multilayer system adjacent the waveguide can be taken from relations mentioned in that Offenlengungschrift. Specifically, Offenlengungschrift No. 2252826, page 2, the first paragraph through page 3, end of the third paragraph, states as follows: "In the reflection polarizers known up to now one obtains linearly polarized radiation by means of reflection from an unpolarized radiation incident in correspondence with the Brewster angle at one or more superimposed border areas of dielectric layers. As early as 1947, M. Banning describes such a structure in an Article in 'Journal Opt. Soc. Amer.', 1947, from page 792 on, in which the reflection ability for the reflection component (s-component) polarized vertically to the plane of incidence is increased by means of a dielectric multi-layer system which is arranged between two prisms.

"Reflection polarizers based upon the Brewster law function, however, have a spectrally wide-banded effect, and the reflection ability can always be suppressed only for the component (p-component) polarized parallel to the plane of incidence.

"It is the objective of the invention to disclose a reflection polarizer in which the s- or p-component from the unpolarized incident radiation can be suppressed in narrow band fashion.

"This object is achieved by means of a reflection polarizer of the initially mentioned type which inventively is dimensioned in such a fashion that for a refractive index structure $n_s(n_1,n_2)^k n_0$ the equation $$k = \frac{1}{2} \cdot \frac{\ln(n_s^2 - n_o^2 \sin^2\theta_o) - \ln(n_o^2 - n_o^2 \sin^2\theta_o)}{\ln(n_1^2 - n_o^2 \sin^2\theta_o) - \ln(n_2^2 - n_o^2 \sin^2\theta_o)}$$

is satisfied with k=0,1,2, .... The reflected radiation is thereby polarized in parallel to the plane of incidence."

The drawings of Offenlegungsschrift No. 2252826 illustrate in FIG. 1 that $n_1 = n_L$ and $n_2 = n_H$ and $n_A = n_O = 1$.

The desired component of the light wave is reflected and refracted back into the fiber from the multilayer system for further transmission. Undesired radiation will pass outwardly through the multilayer system to a circumferential sleeve of highly-absorbent material arranged about the multilayer system and having a matted, frosted or dulled outer surface. Such light will be dispersed from such outer surface and prevented from returning into the light guiding fiber along with the desired wave lengths.

Also in accordance with the invention, the filter for treating the light within the light-guiding fiber is produced by depositing each of the high-refractive and low-refractive materials alternately onto a section of the light-guiding fiber in an evaporation system. The light-guiding fiber is rotated about its axis while the fiber is arranged transversely to the output axis of the respective refractive material evaporation sources.

THE DRAWING

The single drawing FIGURE shows an axial section through the light-guiding fiber and filter of the present invention.

THE PREFERRED EMBODIMENTS

A light-guiding fiber 1 which may particularly be a glass fiber, is surrounded by a multilayer filter system 2. The optic fiber 1 has an axial length and an index of refraction $N_f$. The multilayer filter system 2 circumferentially surrounds an axial portion of the optic fiber 1 which is short in relation to the length of the fiber. The filter comprises alternate layers of materials having high and low indices of refraction $n_{1H}$ and $n_{1L}$. The indices of refraction of the fiber and of the layers are related by $$n_{1H} > n_{1L} > N$$

An effective refractive index N or an effective guide index is defined as a characteristic of a guided mode such as for film waveguides in the text, T. Tamir, ed., Vol. 7, Topics in Applied Physics: Integrated Optics, Springer-Verlag (New York, 1975), at 21. The effective guide index N of Tamir is the refractive index of the fiber core times the sine of the zigzag angle $\theta$, for angles $\theta$ satisfying the transverse resonance condition or dispersion equation for the sum of phase shifts of each guided mode in passing through the fiber (equation 2.1.12 of Tamir). Where the index of refraction of the layers is higher than the effective refractive index, all modes having effective guide indices less than the indices of refraction of the layers will be coupled into the multilayer system.

Multi-chromatic light waves in the light-guiding fiber 1 are coupled into the multilayer filter system 2 in the area of contact 3 therebetween. Depending on the design of the multilayer system 2, the individual wave portions of light passing through the fiber 1 and the filter are treated by interference phenomena after refractions and reflections at the individual boundary areas of the multilayer system, as described in the German Offenlegungschrift No. 2,252,826. Desired wave lengths and polarization directions are coupled back into the light-guiding fiber 1 for further transmission therealong. Undesired wave portions are passed radially outwardly within the multilayer system 2 and enter an absorbing material 4 arranged about the fiber 1 and the multilayer system 2. An outer surface of the material 4 is matted, frosted, or dulled to disperse light impinging thereupon and to prevent it from re-entering the light-guiding fiber 1.

The filter system 2 is produced upon a length of fiber 1 by an evaporation process. The fiber 1 is rotated about its longitudinal axis with a short, desired portion of the fiber adjacent an outlet of an evaporation source containing a material of selected refractive characteristics. When a desired layer of a first material has been deposited about the fiber 1 the fiber is moved to a second station at which a layer of a second refractive material is deposited over the first layer. The fiber is then returned to the first evaporation source for a third layer, and so on.

Although various minor modifications might be suggested by those versed in the art, it should be understood that we wish to embody within the scope of the patent warranted hereon all such modifications as reasonably and properly come within the scope of our contribution to the art.

We claim as our invention:

1. A filter system for an optic fiber, the system comprising:
   an optic fiber having an axial length and an index of refraction $n_f$;
   a multi-layer filter means circumferentially surrounding said optic fiber along an axial portion thereof and not interrupting said fiber, the filter being comprised of alternate layers of materials having high and low indices of refraction $n_{1H}$ and $n_{1L}$; and wherein
   the indices of refraction of the fiber and the layers are related by $$N < n_{1L} < n_{1H}$$

and wherein N is the effective guide index of guided modes of light in the fiber $$N = n_f \sin \theta,$$

wherein $\theta$ is the zigzag angle of the guided modes in the fiber; and
   said multi-layer filter means refracting and reflecting desired light components back into the fiber and absorbing undesired components.

2. A filter system as defined in cliam 1, wherein the filter serves as a polarization filter.

3. A filter system as defined in claim 1, wherein the filter layers each have an effective thickness equal to one-quarter of the wave length of a light to be guided in the fiber.

4. A filter sytem as defined in claim 1, wherein the filter layers are surrounded by an absorbent material.

* * * * *